(12) United States Patent
Reeve et al.

(10) Patent No.: US 9,670,639 B2
(45) Date of Patent: Jun. 6, 2017

(54) PAD FOR SUPPORT OF EQUIPMENT AND METHOD OF PRODUCING SAME

(71) Applicant: Richard and Carolyn Koberg Living Trust, Panora, IA (US)

(72) Inventors: Scott R. Reeve, Dayton, OH (US); Andrew K. Loff, Dayton, OH (US)

(73) Assignee: Richard and Carolyn Koberg Living Trust, Panora, IA (US)

( * ) Notice: Subject to any disclaimer, the term of this patent is extended or adjusted under 35 U.S.C. 154(b) by 0 days.

(21) Appl. No.: 14/967,641

(22) Filed: Dec. 14, 2015

(65) Prior Publication Data

US 2016/0177530 A1   Jun. 23, 2016

Related U.S. Application Data

(60) Provisional application No. 62/093,099, filed on Dec. 17, 2014.

(51) Int. Cl.
*F16M 1/00* (2006.01)
*E02D 27/44* (2006.01)
(Continued)

(52) U.S. Cl.
CPC ............ *E02D 27/44* (2013.01); *B29C 44/186* (2013.01); *F16F 1/37* (2013.01); *F16F 1/373* (2013.01);
(Continued)

(58) Field of Classification Search
CPC .... F16F 15/08; F16F 1/376; F16F 1/44; F16F 1/3713; F16F 1/3732; F16F 1/377;
(Continued)

(56) References Cited

U.S. PATENT DOCUMENTS 3,176,676 A   4/1965   Caldwell
3,415,475 A   12/1968   Goodman
(Continued)

FOREIGN PATENT DOCUMENTS

CA   2821073 C   9/2013
CA   2860490 A1   9/2013
(Continued)

OTHER PUBLICATIONS

Reeve, Scott, drawings of pad with fiberglass bi-directional grid core and J-hooks for lift points, 5'×5'×4" nonconfidential disclosure 2010, 5'×5'×3" version nonconfidential disclosures Apr. 2013.
(Continued)

*Primary Examiner* — Steven Marsh
(74) *Attorney, Agent, or Firm* — McKee, Voorhees & Sease, PLC

(57) ABSTRACT

A pad is provided for supporting heavy loads and is capable of supporting loads of 100 tons or more. The pad has a core having a bi-directional grid formed from parallel fiberglass materials, with a first set of material at right angle to a second set of fiberglass materials and which grid surrounds a closed cell material, which is infused with resin to form a core. A fiberglass top surface, bottom surface and at least one sidewall is provided. The result is a pad able to distribute very heavy loads, is resistant to bending, durable and light weight.

20 Claims, 6 Drawing Sheets

(51) Int. Cl.
*B29C 44/18* (2006.01)
*F16F 1/37* (2006.01)
*F16F 1/373* (2006.01)
*B29K 101/00* (2006.01)
*B29K 105/04* (2006.01)
*B29K 709/08* (2006.01)
*B29L 9/00* (2006.01)
*B29L 31/00* (2006.01)

(52) U.S. Cl.
CPC .... *B29K 2101/00* (2013.01); *B29K 2105/046* (2013.01); *B29K 2709/08* (2013.01); *B29K 2715/003* (2013.01); *B29K 2995/0046* (2013.01); *B29K 2995/0097* (2013.01); *B29L 2009/00* (2013.01); *B29L 2031/751* (2013.01)

(58) Field of Classification Search
CPC ...... F16F 2236/04; F16F 15/02; F16F 1/3605; F16F 1/3737; F16F 2230/0047; F16F 7/00; F16F 1/37; F16F 1/371; F16F 1/373
USPC ................... 248/346.01, 638, 678, 632, 633
See application file for complete search history.

(56) References Cited

U.S. PATENT DOCUMENTS

| | | | |
|---|---|---|---|
| 4,130,293 A | 12/1978 | Hinterreiter | |
| 4,505,449 A * | 3/1985 | Turner | F16M 5/00 248/346.03 |
| D282,241 S | 1/1986 | Sauber | |
| 5,377,976 A | 1/1995 | Metherne | |
| 5,380,269 A | 1/1995 | Urso | |
| 5,427,346 A | 6/1995 | Urgola | |
| 5,589,243 A * | 12/1996 | Day | B29C 44/5654 428/316.6 |
| 5,624,622 A | 4/1997 | Boyce | |
| 5,834,082 A * | 11/1998 | Day | B29C 44/06 428/316.6 |
| 5,895,025 A * | 4/1999 | Alesi | F24F 13/32 108/51.11 |
| 5,979,844 A | 11/1999 | Hopkins | |
| 6,050,539 A * | 4/2000 | Millen | F24F 13/32 248/678 |
| 7,040,659 B2 | 5/2006 | Lagsdin | |
| 7,073,821 B2 | 7/2006 | Lagsdin | |
| 7,172,216 B1 | 2/2007 | Lagsdin | |
| 7,398,664 B1 | 7/2008 | Weinerman | |
| 7,468,025 B2 | 12/2008 | Hauser | |
| 7,520,010 B2 | 4/2009 | Welch | |
| 7,802,814 B2 | 9/2010 | Lagsdin | |
| 7,896,789 B2 | 3/2011 | Hinton | |
| 8,333,134 B1 | 12/2012 | Duffy | |
| 8,393,116 B2 | 3/2013 | Reeve et al. | |
| D686,794 S | 7/2013 | Koberg | |
| 8,814,121 B2 | 8/2014 | Koberg | |
| 2005/0017223 A1 | 1/2005 | Lucas | |
| 2005/0040308 A1* | 2/2005 | Sweeney | F24F 13/32 248/346.02 |
| 2005/0074593 A1 | 4/2005 | Day | |
| 2005/0144866 A1* | 7/2005 | Chappell | B65D 90/24 52/294 |
| 2006/0185408 A1 | 8/2006 | Graham | |
| 2009/0072525 A1 | 3/2009 | Banks | |
| 2009/0286043 A1 | 11/2009 | De Baets | |
| 2010/0266833 A1 | 10/2010 | Day et al. | |
| 2012/0251814 A1 | 10/2012 | Day | |
| 2014/0291475 A1* | 10/2014 | Hubbard | E04B 1/98 248/580 |
| 2014/0319315 A1 | 10/2014 | Koberg | |

FOREIGN PATENT DOCUMENTS

| | | |
|---|---|---|
| CN | 202140760 U | 2/2012 |
| CN | 202698012 U | 1/2013 |

OTHER PUBLICATIONS

Koberg, Richard, U.S. Appl. No. 14/970,419 "Stabilizer pad and handle apparatus" filed Dec. 28, 2015.
Photographs—three—of prototype of handle (photo1) and of multiple stabilizer pads stacked one on the other (photos 2 and 3), non-confidential disclosure offer for sale occurring Mar. 17, 2011.
PCT international search report PCT/US2015/065451, Dec. 14, 2016 and Feb. 12, 2016.
Rocca, S. et al Design, fabrication and testing of low profile composite bypass road panel: phase 1. University of Missouri-Rolla. Jun. 2004 [retrieved Feb. 5, 2016] p. 1-3, 32. Retrieved from the internet: URL: http://library.modot.mo.gov/rdt/reports/ri02016/rdt04017rev.pdf>.

* cited by examiner

PAD FOR SUPPORT OF EQUIPMENT AND METHOD OF PRODUCING SAME

PRIORITY CLAIM

This application claims priority to previously filed U.S. Ser. No. 62/093,099, filed Dec. 17, 2014, the contents of which are incorporated herein by reference in its entirety.

BACKGROUND

Foundation pads or mats as they are sometimes referred to are used in a variety of settings, and particularly to provide a foundation for devices which support heavy loads, including by way of example without limitation, heavy equipment such as truck mounted or similar self-propelled devices, construction equipment, cranes, utility trucks and tree care vehicles, trailers or the like, where a jack, outrigger or similar support device may be used to create a larger footprint to increase the stability of the equipment by the use of a temporary support extending from the main structure. The equipment itself may rest on or move over the pad as well, including but not limited to cranes on crawler tracks, and other motorized, or non-motorized equipment such as trucks, dump trucks, earth moving equipment, heavy haul trailers and the like.

By way of example, without intending to be limiting, equipment may have an outrigger arm extending outwardly from the equipment and a leg extending downwardly, both the arm and leg may be hydraulically operated. The leg may come to rest on a platform or foundation to create the larger footprint and exerts the weight of the equipment onto the surface that it is in contact with. A combination of outriggers may be used by the equipment, for example four outriggers are commonly used with heavy outrigger enabled equipment. The total weight of the equipment and any additional components, including a load supported by a lifting device will be exerted on the combination of outriggers. The foundation pad prevents the stabilizer leg or jack or equipment from breaking through the ground surface, whether soil, rock, asphalt or concrete, or exceeding the allowable or ultimate ground bearing capacity of the surface. Where not properly supported, the equipment can tip, or lean which can cause the equipment to be out of level. Where the equipment is used to lift, it can lose a significant amount of lifting capacity when in a slightly tipped or leaning state. The pad prevents movement of the support or equipment and prevents tipping or rolling over of the equipment. A pad generally has a top wall on which the support device rests and a bottom wall in contact with the ground surface and at least one side wall.

SUMMARY

Provided here is a pad for supporting equipment and which is capable of supporting loads of 100 tons or more. The pad consists of a top surface, bottom surface and at least one sidewall. It has a core which comprises a bi-directional fiberglass grid, formed by at least two webs of fiberglass material oriented parallel to each other and a second set of at least two webs of fiberglass material oriented parallel to each other and where the second set is at a right angle to the first set of fiberglass material. The fiberglass material may be provided in any convenient form, and in one embodiment comprises one or more sheets of fiberglass material. Embodiments provide for one of the sets of fiberglass material to be thicker than the other set of fiberglass material. Another embodiment provides the fibers of one of the sets of material are oriented in a different direction from the second set of fiberglass material. This forms the grid which surrounds closed cell material, in one embodiment, foam. Fiberglass facesheets may be provided on the top and bottom surface, and fiberglass material on the sidewall. Resin is infused in the grid to produce a rigid unit which is the pad. In an embodiment, the core is formed by providing a plurality of foam structures and fiberglass material wrapped around the surface of each foam structure.

DESCRIPTION

Figure 1:
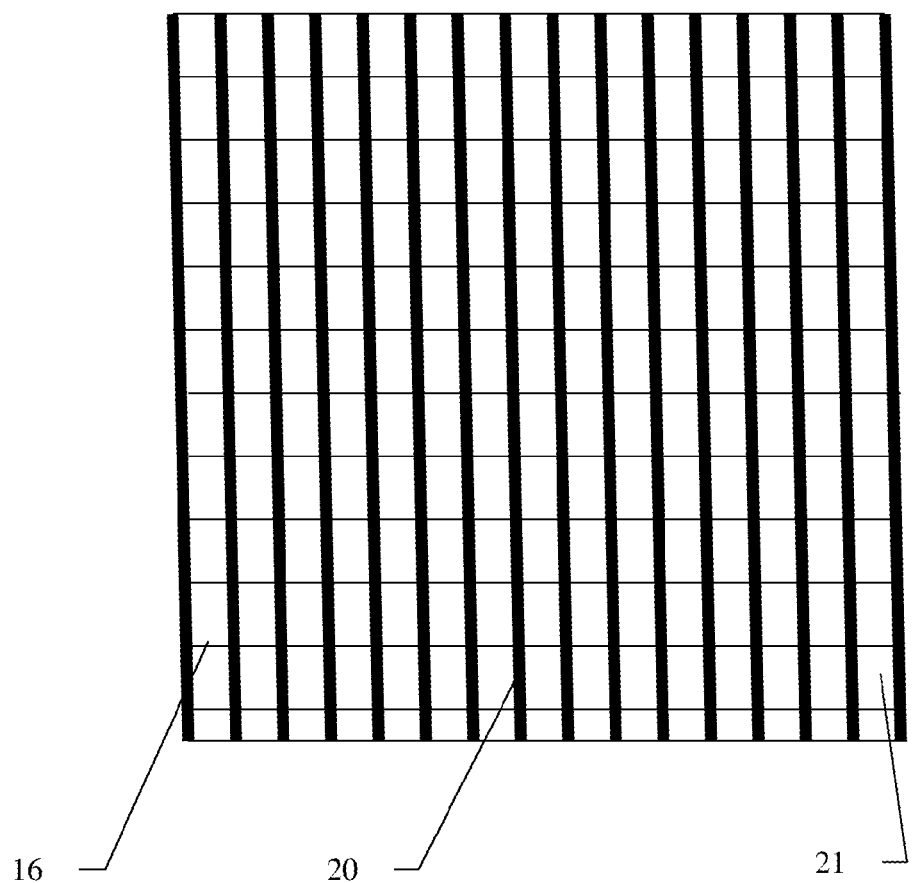
FIG. 1 is a drawing showing a grid of fiberglass material of the pad with primary and secondary webs.

A pad apparatus is provided comprising a pad that has the capacity to support very high equipment loads, such as equipment capable of lifting loads of 100 tons or more. See by way of example stabilizer pads described in the specification, claims and figures of U.S. Pat. No. 8,814,121, incorporated herein by reference in its entirety. A pad refers to a device which provides stabilization and/or foundation for equipment or a machine, where part or all of the equipment or a supporting device for the equipment or machine rests on the pad. For example, a beam, structure, outrigger or other support may project from equipment and aid in supporting the equipment or the equipment itself may be supported on the pad or move across the pad. This is especially useful for heavy equipment such as truck mounted or similar self-propelled devices, heavy construction equipment, cranes, utility trucks, tree care vehicles, recreational vehicles, trailers and the like. The pad can provide load distribution, protects the equipment or support from breakage, prevent the equipment or support from breaking through ground surface and inhibits rolling of the equipment or support. Such devices are well known to one skilled in the art and by way of example, common alternative names include mats, crane mat(s), outrigger pad(s), dunnage pad(s), crane outrigger pad(s) and RV jack pad(s) and the like. The pads are frequently referred to as mats when used in connection with crawler cranes and large mobile cranes. Here the device is referred to as a pad and has capacity not just to stabilize, but can support the entire load of very heavy equipment and is especially useful for supporting very high load equipment such as cranes, oil rigs and equipment that moves over the pads such as dump trucks, earth moving equipment, crawler cranes or hauling equipment or the like.

Current solutions for support of very heavy equipment are either costly to move and/or use natural products such as wood or use steel which will degrade. Here, the weight of the pad may be reduced 50% or more, yet has at least the same bearing strength as the heavier pads, sufficient rigidity and bending resistance or stiffness required for such loads and is not subject to degradation. It is possible here to achieve high load capacity where very heavy loads in a concentrated area are supported. For example, where a high load is concentrated in an area, such as over 300 pounds per square inch, the pad can distribute such a load over an area.

The pad described employs in an embodiment a shear web design having reduced weight using fiberglass and provides for a pad that is over four inches thick.

In an embodiment the pad is designed to support very heavy loads. In an embodiment the loads including loads of 100 tons and more. While the pad can certainly be used with lighter loads, it is capable of supporting such heavy loads. In a further embodiment the pad provides strength and rigidity for loads of 100 tons, over 100, of 200, 300, 400, 500, 600, 700, 800 and 1,000 tons or more and loads in-between. An embodiment provides the load capacity may be more than 62,500 pounds, up to 135,000 pounds, 175,000 pounds, 200,000 pounds, 300,000 pounds, 400,000 pounds, 500,000 pounds, 600,000 pounds, 700,000 pounds, 800,000 pounds or more and amounts in-between. The crush strength in an embodiment may be 400 pounds per square inch and be up to 1000 pounds per square inch or more. What is more the pad is capable of such properties in which the pad is not made of steel or other metal. A preferred embodiment provides the pad is a composite sandwich having an internal core structure of closed cell material, such as foam, and fiberglass reinforcing members (which here are also referred to as webbing), with external facesheet on top and bottom horizontal surfaces, and fiberglass wrapping around the edges. Resin holds the pad together and may be vinyl ester, polyester or epoxy. A preferred embodiment provides the webbing is a similar to the web of an I-beam. The pads in an embodiment have an internal bi-direction grid construction of fiberglass material. Webbing in the core of the pad is provided where two sets of parallel spaced rows of webs are provided with one set at right angles to the other set of webs. The orthogonal pattern of webs form a grid-like configuration of reinforcing members. This allows for distribution of the load to reduce ground-bearing pressure. One example of a fiber core and its manufacture is provided at U.S. Pat. No. 8,149,883, incorporated herein by reference in its entirety.

In an embodiment, an alternate internal core is used that places fiberglass fabrics around foam rather than helically winding fiberglass around the foam and is thicker than previously available. The fiberglass may be E, R or S glass. An embodiment provides a grid is formed by fiberglass webbing where a first set of at least two, and preferably a plurality of web of fiberglass material is provided that are oriented parallel to each other, and a second set of a plurality of web of fiberglass material is provided also oriented parallel to each other and at a right angle to the first set to form a grid. In one embodiment, a first set of webs (primary webs) 16 is a different thickness from the second set of webs (secondary webs) 20 as is shown in FIG. 1. As discussed herein, the fiberglass material can be provided in any convenient form, such as sheets, spraying the material, or in any other form or applied by any method suitable to place fiberglass adjacent the closed cell material. An embodiment provides the fiberglass material comprises sheets of fiberglass material and thickness may be increased by providing for more than one sheet of fiberglass material. Providing for optimum spacing between the webbing and thickness of the webbing allows for higher load capacity and improved crushing resistance to concentrated loads. The internal core comprises the grid of fiberglass web, closed cell material and infused resin. In an embodiment preferred internal grid core parameters are:

Core thickness 3.5" to 11¼"
Web spacing 3" to 8" (center to center)
Web thickness 1/16" to ¾"

Web modulus of elasticity 1,000,000 psi (pounds per square inch) to 5,000,000 psi
Web tensile strength 10,000 psi to 60,000 psi
Web In-plane shear strength 5,000 psi to 25,000 psi The resulting grid is thus comprised of a series of web cells. Size and aspect ratio of the web cells can be varied and examples of useful ratios are 1 to 5. Referring to FIG. 1, a first set of fiberglass web may be referred to as primary web 16, and the second set of fiberglass web referred to as secondary web 20. The primary and secondary web form multiple web cells 21. In referring to primary or secondary is not intended to imply an order of production of the webbing, but is for convenience. The web cell aspect ratio is in an example the ratio of the primary over secondary web spacing. Where, for example, the primary web and secondary web is spaced such that the width of the web cell is six inches and the length is 2 inches the web cell that is formed has a web aspect ratio of 3. A preferred aspect ratio of the pad itself is 1 to 1.5.

Figure 2:
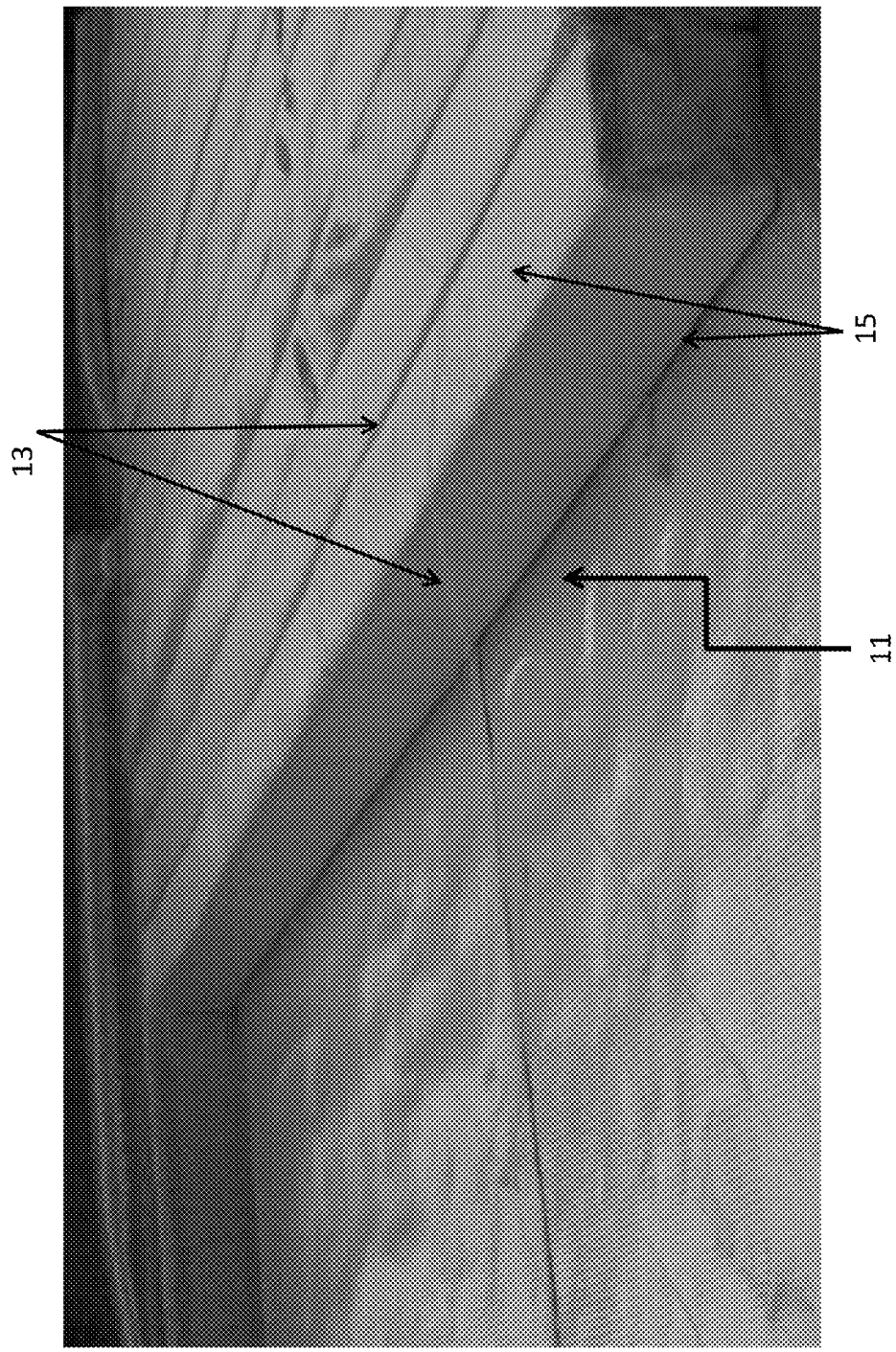
FIG. 2 is a picture of a foam block.

The grid surrounds the closed cell material which may in an embodiment be foam. The foam may be any closed cell foam and in a preferred embodiment is between 1 lb/ft$^3$ and 6 lb/ft$^3$ density. A further embodiment provides that a plurality of closed cell materials are provided adjacent to each other. In an example detailed below, the closed cell material comprises multiple foam blocks or tubes which are placed adjacent each other. Such blocks or tubes comprise parallel opposite side surfaces, parallel opposite faces perpendicular to the side surfaces and end surfaces. Fiberglass may then be placed adjacent to the parallel opposite side surfaces. For example, see FIG. 2 where a series of blocks is shown (the figure does not represent a bi-directional core, but illustrates blocks of foam and the surfaces of blocks). A foam block 11 is shown having opposite side surfaces 13 and opposite face surfaces 15. The block of foam in this instance has a fiberglass material wrapped around it. As shown, fiberglass material may also be placed on the ends of the block of foam. It is to be appreciated that the block of closed cell material can take any convenient form (here the example shows rectangular forms, though other forms may of course be used where the forms may be placed adjacent each other), and when provided in a plurality in this fashion the grid may be created around the forms. The manner of placement of the fiberglass material may be accomplished in any convenient manner, such as by wrapping or encapsulating the fiberglass around the closed cell surfaces or the like.

The pad comprises a top surface, bottom surface and sidewall comprising fiberglass material. As noted above, the fiberglass sidewall in an embodiment may be formed by wrapping the ends of the closed cell material. The top surface and bottom surface of the pad comprise a fiberglass material, also called a fiberglass facesheet or fiberglass laminate with a fiberglass facesheet on the top of the grid and closed cell material and a fiberglass facesheet on the bottom of the grid and closed cell material. In an embodiment, the top surface and bottom surface may be formed by placing the grid of fiberglass web and closed cell material into a mold with the bottom fiberglass facesheet in the bottom of the mold and the top fiberglass facesheet place on top of the grid and closed cell material. Once resin is added, the top facesheet, bottom facesheet, grid of fiberglass web and closed cell material become a rigid unit which is the pad. Still further embodiments provide one or both top and bottom surfaces may have optional paint or modifications to the surface, such as applications of a non-stick material. In one embodiment the pad comprises a yellow top surface and black protective frame.

Resin is infused in the grid. It may be applied in any convenient fashion, as by injecting, pouring, spraying or the like. Resin is a viscous composite material and includes, by way of example without limitation, vinyl ester, polyester or epoxy. Once hardened, a rigid unit is produced with fiberglass exterior. An option provides that a protective frame may be added to all or a portion of the pad. The frame may be made of any material which protects the pad, such as plastic, aluminum, steel or other metal or the like.

For the first time, pads over four inches thick (height) have been produced. A preferred embodiment provides the pads are over four inches thick, including up to about 4.5, 5, 6, 6.5, 7, 7.5, 8, 8.5, 9, 9.5, 10, 10.5, 11, 11.5, 12 inches thick or any amount or fraction in-between. The pads may be square, substantially round, rectangular, hexagon or any convenient shape. A preferred embodiment provides they are substantially rectangular in shape. The dimensions can vary depending upon what is convenient for the particular conditions. Examples are provided below.

The pads are produced in an embodiment by determining the maximum load, which contacts the pad, the maximum pressure exerted onto the pad, the ground conditions (ground bearing capacity), and handling limitations that may affect pad size, that is, limitations due to the ability to ship pads using trucks or the like and handling the pad using forklifts or other equipment moving devices. The pads are designed to be strong enough to not crush at high concentrated loads, rigid enough to resist bending and a sufficient combination of strength and rigidity to distribute the load sufficiently and reduce pressure being exerted on the ground.

The dimensions used will vary depending upon the load to be supported. Sizes of the pad can in a preferred embodiment range up to 50' length by 12' width by 12 inch height. Examples of the dimensions and load are provided below:

TABLE 1

| PRODUCT | W × L × H | AREA (sq ft) | WEIGHT (lbs) | CRUSH RATING (psi) | RATED CAPACITY (lbs) |
| --- | --- | --- | --- | --- | --- |
| FM5x4x4 | 5' × 4' × 4" | 20 | 340 | 500 | 100,000 |
| FM6x4x6 | 6' × 4' × 6" | 24 | 500 | 500 | 175,000 |
| FM7x5x6 | 7' × 5' × 6" | 35 | 680 | 500 | 175,000 |
| FM8x5x10 | 8' × 5' × 10" | 40 | 1,280 | 1,000 | 325,000 |
| FM9X6X10 | 9' × 6' × 10" | 54 | 1,670 | 1,000 | 325,000 |
| FM9x7x10 | 9' × 7' × 10" | 63 | 1,900 | 1,000 | 325,000 |
| FM10.5x7.5x12 | 10.5' × 7.5' × 12" | 79 | 2,590 | 1,000 | 375,000 |

The above is provided by way of example and the pads can be formed into various dimensions depending upon the size of the equipment to be supported and the surface upon which the pad is placed.

A still further embodiment provides the pad is capable of supporting a crawler crane, which can have a load of 800,000 lb. or more. Where a large pad as described above may be, for example 14'×7'×10 inches a pad supporting a crawler crane in an embodiment may be 8'×4'×10 inches up to 50'×12'×12 inches and in a further embodiment be 30'× 10'×12 inches. In an embodiment, two or three or more of such pads are placed next to one another together for the crawler crane to move over. Because of the weight of a moving vehicle traveling over the surface, a different surface is used in an embodiment. The surface needs to be abrasion resistant, so the tracks do not scar the pad, be light weight, stiff and resistant.

Preferred embodiments also provide for a protective frame for the pad, as discussed further below, which may be omitted if desired. Lift points are also useful for lifting and moving the pad from one location to another. These can be in the form of J-hooks, D-rings, steel pins in channels or the like. An embodiment generally provides for four or more lift hardware devices. Fiberglass can also be an insulator and adding metal for static dissipation may be preferred. A metal strap is one example of such a static dissipation device, and here another embodiment provides for production of a static dissipation device that is less expensive by providing a steel plate on the top surface of the pad. The metal device can take any form as long as it assists in dissipating static. Embodiments also provide for a non-slip surface and reflective safety tape.

The pad is lightweight but is rigid and is resistant to bending when a heavy concentrated load is placed upon it. The mat is resistant to degradation by chemicals and water. The pads have high compressive strength, flexural strength, can be used in poor soil conditions and last longer than hardwood or steel, that may have a lifespan of over twenty years.

EXAMPLES

Figure 3:
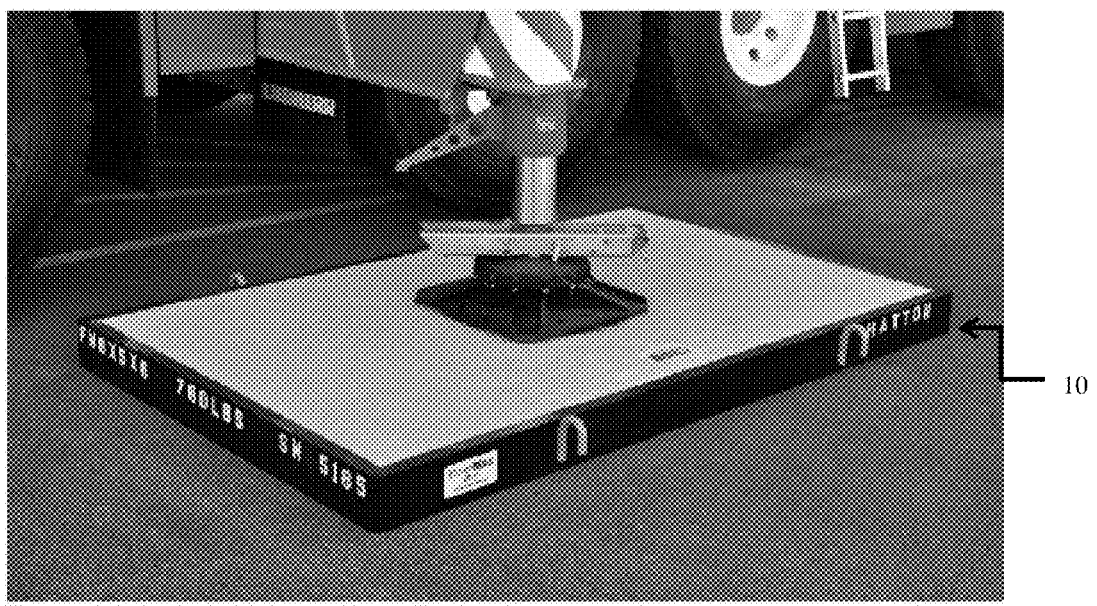
FIG. 3 is a picture of equipment resting on a pad.
Figure 4:
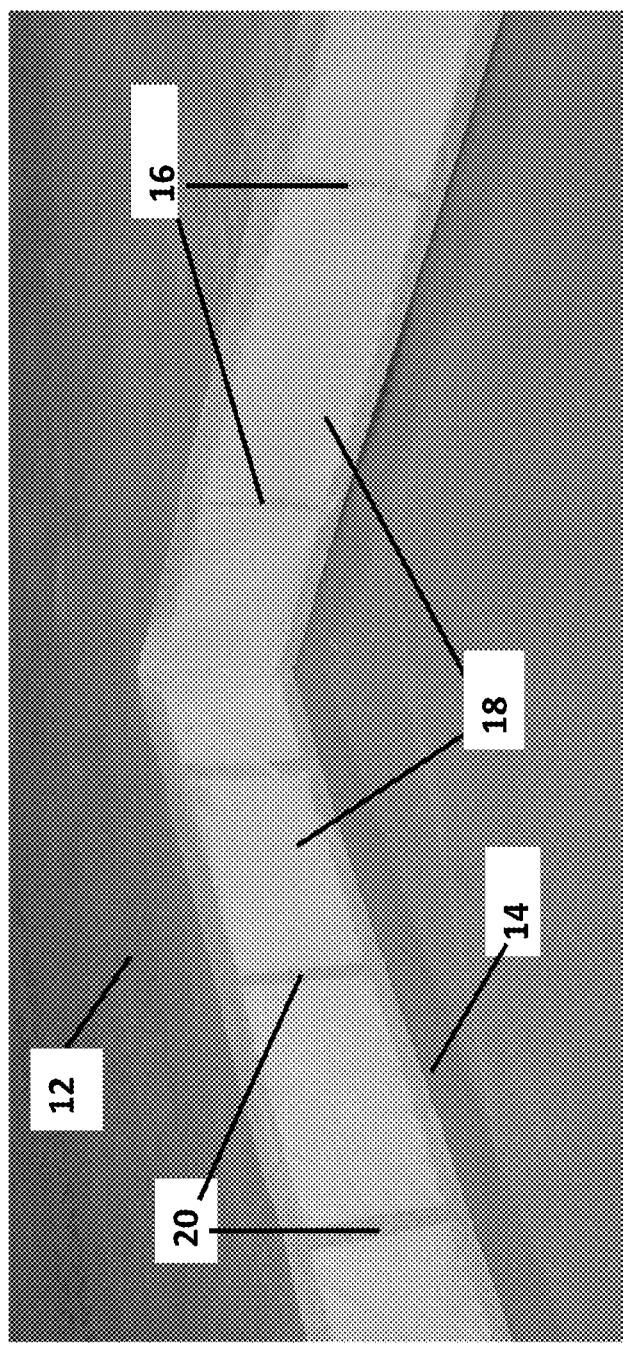
FIG. 4 is a picture of a cross section of an embodiment of the pad.
Figure 5:
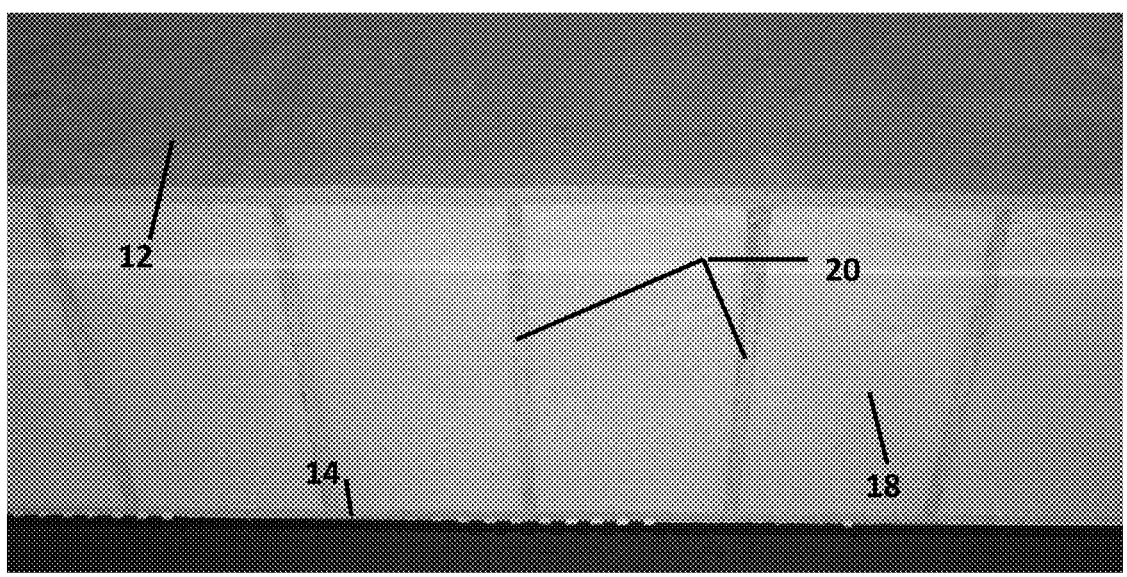
FIG. 5 is a picture of a cross section of an embodiment of the pad.
Figure 6:
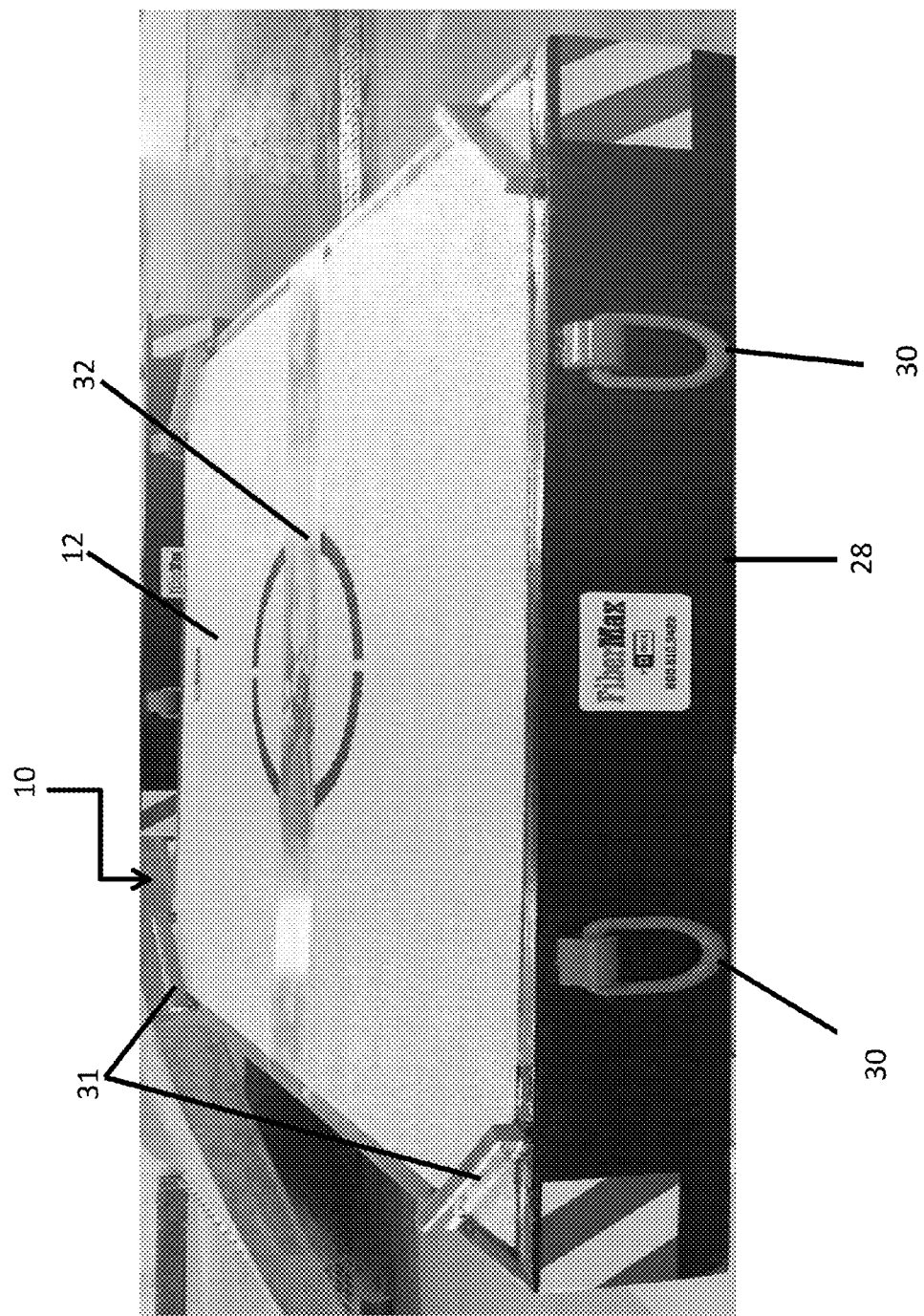
FIG. 6 is a picture of a pad.

The following is provided by way of example and not intended as a limitation of the scope of the invention.
Example of High Load Pad For these large structural mats, a sandwich construction is used. A pad 10 in use supporting equipment is shown in FIG. 3. FIGS. 4 and 5 show the construction. FIG. 4 shows a bi-directional core which in an optional embodiment has the thicker webs in the primary direction and the thinner webs in the secondary direction. This figure shows a triangular section removed from a pad 10. The top surface 12 and bottom surface 14 are facesheet laminate. As in the construction shown in FIG. 1, a first set of at least two fiberglass web (referred to also in this example as "primary web") 16, each web comprising fiberglass, which in an embodiment can be one or more sheets of fiberglass, the web oriented between the closed cell foam 18, such that the webs are parallel to each other. Provided at a right angle to the first set of fiberglass web is a second set of fiberglass web 20, each web comprising fiberglass material, the second set of web also oriented parallel to each other and at a right angle to the first set of web, and together the sets of fiberglass webs form a grid. A further embodiment provides the fiberglass web may be one or more sheets of fiberglass material. FIG. 5 shows a cross section in which the secondary web 20 is exposed along with top surface 12, bottom surface 14 and closed cells 18. The figure demonstrates all the elements include the top surface facesheets, bottom surface facesheets, grid and closed cell material are fully integrated. If additional strength or stiffness is desired, a secondary fiberglass laminate can be bonded to the top of the pad. FIG. 6 shows a pad 10 fully assembled with additional features. Top surface 12 in this instance has been provided in a yellow color with markings. It is surrounded by a protective frame 28 and provided with D ring lift points 30. Optional stacking blocks 31 also referred to as angled corner cribbing are provided on each corner of the pad, which aid in stacking multiple pads on tops of each other. A static dissipation metal strip 32 is also provided. Clearly many other optional accessories may be included, with different lifting hardware, such as J-Hooks or Crosby lifting points, stack and pin lifting and storing hardware, for example.

Fiberglass Fabrics

The reinforcement providing strength and stiffness in this example are E-glass fiberglass fabrics in this example, electrical grade. These are available in a number of forms with different combinations of fibers running in different directions. The glass fibers may be woven or stitched into the fabrics and there are a variety of weaving patterns. The pads or mats in this example use two fiberglass fabrics. One is highly directional with fibers primarily in the 0° direction for resisting the bending loads across the span. The second is a triaxial fabric with fibers in the ±45° directions for in-plane shear and fibers in 90° direction for a balance of properties. The direction may be varied, with examples using 0, 45, −45, 90. As can be appreciated here, one set of fiberglass web may have fiber in a different direction from the second set and material may have fiber in multiple directions.

These fabrics are used in the external facesheets and the internal core. For the facesheets, preferred parameters are:
  Skin thickness ⅜"-1"
  Skin modulus of elasticity 2,500,000 psi-4,000,000 psi
  Skin tensile strength 35,000 psi-55,000 psi
  Skin in plane shear strength 5,000 psi-25,000 psi Core A fiber reinforced core is provided. In this example, fiberglass fabrics are wrapped around the foam pieces to create the core sections. The fibers are located at angles to provide the desired shear properties. The fibers are located at angles to provide the desired shear properties. Depending on how the fabric is wrapped, angles in this example can be varied from 25° to 65°, with the typical angle being ±45° angles since this attains the highest shear properties. After these fibers are infused with resin, they form very strong and stiff shear webs for the sandwich cross-section. The fiber in the core is in a vertical plane, whereas the fiber in the facesheets is in the horizontal plane. The width of the core sections determines the spacing of the webs. The closely spaced webs provide very good crushing resistance to concentrated loads. There is no local skin deflection since the skins are so well supported by the webs. The redundancy of the multiple webs provides improved damage tolerance over thick, wider-spaced webs. The foam is closed cell so it does not absorb water. These constituent materials are joined together in the molding process so that the pad is one integral piece.

For the internal core, preferred values for these examples are:

TABLE 2

| Design Variables | 6 | 8 | 10 | 12 |
|---|---|---|---|---|
| Core thickness | 5.24" | 7.04" | 9.04" | 11.04" |
| Primary Web spacing | 3.2" | 3.5" | 3.5" | 3.5" |
| Secondary Web spacing | 4.02" | 4.18" | 4.18" | 4.18" |
| Primary Web thickness | 0.2" | 0.5" | 0.5" | 0.5" |
| Secondary Web thickness | 0.024" | 0.182" | 0.182" | 0.182" |
| Primary Web modulus of elasticity | 3,000,000 psi | 4,170,000 psi | 4,170,000 psi | 4,170,000 psi |
| Secondary Web modulus of elasticity | 3,000,000 psi | 4,170,000 psi | 4,170,000 psi | 4,170,000 psi |
| Primary Web tensile strength | 40,000 psi | 59,000 psi | 59,000 psi | 59,000 psi |
| Secondary Web tensile strength | 40,000 psi | 59,000 psi | 59,000 psi | 59,000 psi |
| Primary Web In-plane shear strength | 15,000 psi | 12,000 psi | 12,000 psi | 12,000 psi |
| Secondary Web In-plane shear strength | 12,000 psi | 12,000 psi | 12,000 psi | 12,000 psi |

Resin

The resin holds the fiberglass together as a composite material and in this case is vinyl ester, but can for example also be polyester or epoxy. The vinyl ester has an optimum combination of good structural properties, excellent molding properties, excellent durability, superior moisture resistance and has a Class 2 fire retardant rating per the flame spread index of ASTM E-84. Pigment can be added to the resin to provide a color.

Protective Frame

The pads may have but do not require a protective frame perimeter which can be made of any material which will protect the pad, such as plastic, aluminum, steel, other metal or the like. (Crawler crane mats for example typically may not have a steel frame as they are not moved frequently so do not need the additional protection from handling.) In one example the protective frame is steel. This frame protects the structural fiberglass pad from handling or transport damage. The frame may provide a location for attaching or connecting lift points. The fiberglass pad is typically molded inside the frame. It is an option to add the frame to the fiberglass pad after it is molded.

Lift Points

To provide for mechanically assisted lifting of these large pads, lift points may be added to the frame. There are typically four lift points per pad. Many types of features can be used. The typical lift points are J-hooks, D-rings and Stack &Pin tubes. Stack & Pin tubes are steel box tubing with a welded clevis on top. When the pads are stacked upon each other, a pin is inserted through the tube of the upper pad and clevis of the lower pad so the pads are held together.

Non Slip Wear Surface

A non-slip wear surface may be used on the top surface of the deck. While the surface can employ any useful material that reduces slipping, in this example epoxy polymer mixed with aluminum oxide grit (high grade sand) is used. Standard wear surface color is yellow, but any color is an option. This can be typically used on the top only for safety of workers walking on the pads. It may be used on the bottom of the pads if they will be stacked on top of other or used on packed snow.

Protective Coating

The frame and lift points may be coated with a durable polyurethane coating. It protects any steel from corrosion. It is attractive and can be color-matched with other structures.

Markings on Surface

Targets can be painted on the top surface to direct the operators to set the crane outrigger floats in the best location for structural performance.

Static Dissipation Plates

In some situations, the fiberglass pad acts as an electrical insulator between the metal crane and the ground. If those conditions are possible, then some form of meta for static dissipation, such as plates may be added and may be added to the top of the pad. These provide a conductive path from the outrigger float to the dissipation plate to the pad steel frame to the ground.

Stacking Bars

For instances where pads are stacked using forklift trucks, a separator such as steel bars or box tubes are examples of devices that can be welded at the top corners for the pads to create a space between pads when they are stacked up.

Design Analysis Basis Example

The load distribution into the ground and load capacity of the large pad is highly dependent on the characteristics of the ground below the pad.

To properly analyze the performance of the pad, one obtains an understanding of the soil characteristics of a job site. The most important design property of the soil is the Modulus of Subgrade Reaction (MSR) of the soil. MSR is a measure of the soil stiffness (can be thought of as a spring constant) and directly affects the load distribution of the pad and the load the pad can safety support.

For this design analysis example there are three MSR values that are analyzed: 20,000 lbf/ft$^2$/in; 40,000 lbf/ft$^2$/in; and 80,000 lbf/ft$^2$/in. These selected values are designed to represent a range of typical site set-up soil conditions. In basic terms, an 80,000 lbf/ft$^2$/in MSR means that 80,000 lbf loaded on one square foot will compress the soil one inch. Table 3 below shows examples of typical soil MSR or "k" values:

TABLE 3

Typical Modulus of Subgrade Reaction Values ($k_s$)

| Type of Soil | $k_s$ (lbf/ft$^2$/in) |
| --- | --- |
| Dense sandy gravel | 115,200-201,600 |
| Medium dense coarse sand | 86,400-172,800 |
| Medium sand | 57,600-144,000 |
| Fine to silty fine sand | 41,760-100,800 |
| Medium clay | 21,600-72,000 |
| Soft clay | 864-21,600 |

To simplify this and to correlate to industry standards, the values have been converted to soil bearing capacities. Table 4 details the correlation between MSR and soil bearing capacity:

TABLE 4

Modulus of Subgrade Reaction and Soil Bearing Capacity Correlation

| Soil Bearing Capacity (lbf/ft$^2$) | Soil Compression at Soil Bearing Capacity (in) | Modulus of Subgrade Reaction (lbf/ft$^2$/in) |
| --- | --- | --- |
| 2,500 | 1/8 | 20,000 |
| 5,000 | 1/8 | 40,000 |
| 10,000 | 1/8 | 80,000 |

Design Analysis Methodology Example

Finite Element Analysis (FEA) Outputs

To properly analyze the interaction of the pads with various soil conditions, an FEA is used to determine the following outputs:
  Maximum In-Plane Failure Index (Tsai-Wu)
  Maximum Ground Pressure
  Maximum Displacement The Tsai-Wu failure criterion is a phenomenological material failure theory, which is widely used for anisotropic composite materials that have different strengths in tension and compression. In very basic terms a Tsai-Wu of greater than or equal to 1 indicates failure.

Finite Element Analysis (FEA) Inputs

An FEA requires each sub component of the pad be modeled.

In general, the construction of the pad consists of fiberglass skins and an internal structure of a bi-directional grid of fiberglass webs. The FEA inputs to complete this analysis consists of the following inputs for the fiberglass construction of the pad are:
  Tensile Strength
  Compression Strength
  Compression/Tensile Average Modulus
  Shear Strength
  Shear Modulus
  Poisson's Ratio
  Density For the purpose of this analysis, the MSR values are broken down into the series of springs. The spring constant applied to these springs is consistent with the MSR for the various soil conditions. This is a simplification of the reality of soil mechanics.

To fully analyze a specific soil, knowledge of additional properties is used, such as: mass density; Poisson's ratio; cohesion; angle of friction; soil modulus and others. Determining these properties for every crane set-up is not practical given the transient nature of crane usage.

What is claimed is:

1. A pad for support of equipment, said pad capable of supporting loads of 100 A pad for support of equipment, said pad capable of supporting loads of 100 tons or more, comprising,
  (a) a top surface, bottom surface and at least one sidewall comprising fiberglass material,
  (b) a core having a thickness of at least 3.5 inches comprising,
    (i) a grid formed by fiberglass webbing comprising (a) a first set of at least two web comprising fiberglass material, said at least two web spaced apart from and oriented parallel to each other and 3 inches to 8 inches apart, (b) a second set of at least two web of fiberglass material, said at least two web spaced apart from and oriented parallel to each other and 3 inches to 8 inches apart, said second set of web oriented at a right angle to said first set of web to form said grid, said web having a thickness of 0.024 to 0.75 inches such that said webbing has web modulus of elasticity of at least 1,000,000 pounds per square inch (psi), web tensile strength of at least 10,000 psi, and web in-plane shear strength of at least 5,000 psi;
(ii) closed cell material surrounded by said grid; and
(iii) resin infused into said grid to form a pad more than four inches thick and is capable of supporting loads of 100 tons or more.

2. The pad of claim 1, wherein said webbing has a web modulus elasticity of 1,000,000 to 5,000,000 psi, web tensile strength of 10,000 psi to 60,000 psi, and web in-plane shear strength of 5,000 psi to 25,000 psi.

3. The pad of claim 1, wherein one set of fiberglass material is thicker than the other set of fiberglass material.

4. The pad of claim 1, wherein said fiberglass material comprises sheets of fiberglass, and said web comprises one or more of said sheets of fiberglass.

5. The pad of claim 1, wherein said webbing comprises a plurality of web cells and the web cell aspect ratio of said grid is from 1 to 5.

6. The pad of claim 1, wherein said web of fiberglass comprises fibers oriented in a direction of 0° to 90°.

7. The pad of claim 5, wherein said fibers of one set of web of fiberglass material is oriented in a different direction from the other set of web of fiberglass material.

8. The pad of claim 1, wherein said closed cell material comprises foam.

9. The pad of claim 1, wherein said pad is 6 inches to 12 inches thick.

10. The pad of claim 1, wherein said pad is substantially rectangular in shape.

11. The pad of claim 1, wherein said pad is at least 6 feet in length, 4 feet in width and 6 inches in thickness.

12. The pad of claim 1, wherein said pad is 8 feet in length, 5 feet in width and 10 inches thick.

13. The pad of claim 1, said pad having crush strength of at least 500 pounds per square inch.

14. The pad of claim 1 further comprising a protective frame surrounding said pad.

15. A pad for support of equipment, said pad capable of supporting loads of 100 tons or more, comprising,
(a) a top surface, bottom surface and at least one sidewall comprising fiberglass material,
(b) a core having a thickness of 3.5 inches to 11.25 inches, said core comprising,
(i) a grid formed by fiberglass webbing comprising (a) a first set of at least two web comprising fiberglass material, said at least two web spaced apart from and oriented parallel to each other and 3 inches to 6 inches apart and having a thickness of 0.06 to 0.75 inches, (b) a second set of at least two web of fiberglass material, said at least two web spaced apart from and oriented parallel to each other and 4 to 8 inches apart and having a thickness of 0.024 to 0.25 inches, said second set of web oriented at a right angle to said first set of web to form said grid such that said webbing has web modulus of elasticity of 1,000,000 pounds per square inch (psi) to 5,000,000 psi, web tensile strength of 10,000 psi to 60,000 psi and web in-plane shear strength of 5,000 psi to 25,000 psi;
(ii) foam surrounded by said grid; and
(iii) resin infused into said grid to form a pad six to 12 inches thick and said pad is capable of supporting loads of 100 tons or more.

16. A method of producing a pad for support of equipment, said pad capable of supporting loads of 100 tons or more, the method comprising,
(a) forming a grid of fiberglass webbing comprising (a) a first set of at least two of web comprising fiberglass material, said at least two web spaced apart from and oriented parallel to each other and 3 inches to 8 inches apart, (b) a second set of at least two web of fiberglass material, said at least two web spaced apart from and oriented parallel to each other and 3 inches to 8 inches apart, said second set of web_oriented at a right angle to said first set of web to form said grid, said web having a thickness of 0.024 inches to 0.75 inches such that said webbing has web modulus of elasticity of at least 1,000,000 pounds per square inch (psi), web tensile strength of at least 10,000 psi and web in-plane shear strength of at least 5,000 psi;
(b) providing closed cell material surrounded by said grid;
(c) infusing resin into said closed cell material and said grid to form a core having a thickness of at least 3.5 inches;
(d) providing fiberglass material on the top surface and bottom surface of said core to form a pad at least four inches thick and said pad is capable of supporting loads of 100 tons or more.

17. The method of claim 16 further comprising preparing said core by providing a plurality of said closed cell materials adjacent to each other, said closed cell materials comprising parallel opposite side surfaces, parallel opposite faces perpendicular to said side surfaces and end surfaces, placing at least one sheet of web adjacent to said side surfaces of said closed cell materials, placing at least one web of fiberglass material adjacent to said opposite faces of said closed cell material such that said fiberglass adjacent said side surfaces is said first set of web and said fiberglass adjacent said opposite faces is said second set of web.

18. The method of claim 17, wherein said at least one web of fiberglass material is placed by wrapping or encapsulating at least one sheet of fiberglass around said opposite side and opposite face surfaces of said closed cell material.

19. The method of claim 17 further comprising placing at least one second sheet of material adjacent said opposite side surfaces or said opposite face surfaces.

20. The method of claim 16, wherein said closed cell material comprises foam.

* * * * *